4
United States Patent Office 3,152,162
Patented Oct. 6, 1964

3,152,162
POLYISOCYANATE-CARBODIIMIDE ADDUCTS AND PROCESS FOR THE PRODUCTION THEREOF
Peter Fischer, Cologne-Stammheim, and Ernst Meisert, Leverkusen, Germany, assignors to Farbenfabriken Bayer Aktiengesellschaft, Leverkusen, Germany, a corporation of Germany
No Drawing. Filed July 20, 1960, Ser. No. 43,987
Claims priority, application Germany July 29, 1959
7 Claims. (Cl. 260—453)

This invention relates to a method of preparing organic polyisocyanates and more particularly to a method of preparing an organic polyisocyanate-carbodiimide adduct.

It has been heretofore known to prepare carbodiimides by the thermal decomposition of aromatic isocyanates. These carbodiimides, however, are unstable (see Chemical Reviews, volume 53, page 145, 1953). Carbodiimides of 4,4'-diisocyanato-diphenyl methane prepared by prior art methods are high polymers which are solid, insoluble products. This is pointed out in the Journal of the American Chemical Society 1958, volume 80, page 5496. It is also known from German specification 1,012,601 that carbodiimides react with isocyanates to form adducts which split into the original reactants upon being heated.

It is an object of this invention to provide an improved process for the production of polyfunctional isocyanates: It is another object of this invention to provide an improved process for the production of isocyanates of the diphenyl methane series. It is still another object of this invention to provide an improved method of preparing isocyanates of the diphenyl methane series which contain adducts of carbodiimides. It is a further object of this invention to provide an improved method of preparing polyfunctional isocyanates of the diphenyl methane series which contain adducts of carbodiimides and isocyanates in a single working step. It is a still further object of this invention to provide a process for the production of stable polyfunctional isocyanates which contain masked isocyanate groups in the form of carbodiimide-isocyanate adducts as well as free isocyanate groups in a single working step starting from mixtures of polyfunctional aromatic amines such as those formed by the condensation of aniline in mineral acid solutions with formaldehyde or formaldehyde engendering substances.

The foregoing objects and others which will become apparent from the following description are accomplished in accordance with the invention, generally speaking, by providing a process for the production of carbodiimide-isocyanate adducts containing free isocyanate groups by heating polyisocyanates of the diphenyl methane series to a temperature of at least about 150° C. until a maximum of 33% of the existing isocyanate groups have entered in the formation of thet carbodiimide and thereafter cooling the reaction mass to room temperature.

Polyisocyanates of the diphenyl methane series are prepared generally by the condensation of aniline with formaldehyde to form the following amines which are subsequently phosgenated to produce the corresponding isocyanates in the approximate percentages set forth:

1 to 3% of 2,4'-diaminodiphenyl methane,
70 to 85% of 4,4'-diaminodiphenyl methane,
10 to 20% of 2,4-bis-(4-aminobenzyl)-aniline,
3 to 8% of tetra, penta, and hexafunctional diphenyl methane bases.

The higher functional diphenyl methane bases are further defined as compounds having at least two benzene nuclei which are connected to each other by one carbon atom. Each benzene nucleus bears one $NH_2$-group and can be if desired otherwise substituted for instance by alkyl, alkoxy, halogen and nitro groups. Also the carbon bridge can be substituted by alkyl or alkoxy groups or it can be a carbonyl carbon atom. Amines of the diphenyl methane series are for instance described in German Patent 399,141 and in Helvetia Chemica Acta, volume 12, 1929, pages 865–869.

This mixture or an individual enriched component in pure form is then phosgenated in a known manner to produce the correspoding polyisocyanate. The different polyisocyanates formed may be also enriched or isolated after the phosgenation step has been conducted if desired. The amines of the diphenyl methane series can be converted into the corresponding polyisocyanates by carrying out the phosgenation in an inert solvent in accordance with the procedure set forth in German patent specification 949,227. The crude product which remains after the excess phosgene has been eliminated and the solvent has been evaporated or the pure polyisocyanate of the diphenyl methane series should contain more than 90% of the total nitrogen in the form of isocyanate groups.

In accordance with the process of this invention, the polyisocyanates of the diphenyl methane series are subjected to a heat treatment at normal or reduced pressure at a temperature of from about 150° C. at about 300° C. and preferably from about 180° C. to about 220° C. As the reaction proceeds, it is possible to observe carbon dioxide being split off. This carbon dioxide results from the formation of one mol of the carbodiimide from two mols of the isocyanate in accordance with the following equation:

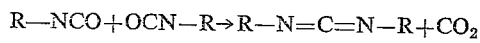

$$R-NCO + OCN-R \rightarrow R-N=C=N-R + CO_2$$

where R is the substituted phenyl radical of the diphenyl methane series. The carbodiimides are formed to a small extent with enlargement of the molecule.

By polyisocyanates of the diphenyl methane series is meant any compound bears one NCO-group and can be if desired otherwise substituted for instance by alkyl, alkoxy, halogen and nitro groups. Also the carbon bridge can be substituted by alkyl or alkoxy groups or it can be a carbonyl carbon atom.

The reaction toward the formation of carbodiimide proceeds autocatalytically, that is, the carbodiimides being formed catalyze the further decomposition of the isocyanate groups. The formation of the carbodiimides is dependent upon time and can be approximately represented by a parabolic curve having the formula $$g = 100 - bt^2$$

where $g$ represents the proportion of unreacted isocyanate groups based on the initial concentration of 100, $t$ represents the time in hours and $b$ is a factor depending substantially on the decomposition temperature and to a small extent on the composition of the original isocyanate mixture.

When the temperature of the reaction, that is the decomposition temperature is maintained at about 220° C., the factor $b$ is between about 0.1 and about 0.6. With a decomposition temperature of about 180° C., the factor $b$ is between about 0.01 and about 0.06. The factor $b$ corresponds to a 10% decomposition at 220° C. in 4 to 10 hours while at 180° C. the period for 10% decomposition is between about 13 and 32 hours.

In order to obtain products which are liquid or at least fusible, which may be readily used in subsequent reactions, no more than 50% of the isocyanate groups originally present should be used in the conversion to carbodiimide-isocyanate adducts. Therefore, as soon as a maximum of 33% of the isocyanate groups which are present have been decomposed to form the carbodiimide, the polyisocyanate-carbodiimide mixture is cooled to room temperature which is defined for the purpose of this application as being from about 0° C. to about 60° C. Within this temperature range, the carbodiimide groups react with the free isocyanate groups remaining in the mixture in the molar ratio of 1:1. This further reaction resulting in the carbodiimide-polyisocyanate adduct causes the additional enlargement of the molecule so that no more than 50% of the originally present isocyanate groups are used.

In order to determine the progress of the reaction at the high temperature to form the carbodiimide, the carbon dioxide produced in the reaction can be collected. This then accurately indicates the number of —NCO groups which have reacted.

The carbodiimide-isocyanate adducts absorb light in the infra-red range at from 5.76 to 5.78 microns and also from 7.24 to 7.22 microns. The products of the instant invention find particular utility as intermediates in the production of polyurethane plastics. For example, these compounds may be further reacted with organic compounds containing active hydrogen containing groups such as, for example, hydroxyl polyesters and polyhydric polyalkylene ethers to produce valuable end products such as elastomeric products suitable for use as tires, shaft couplings, motor mounts and the like. The products of this invention are particularly suitable as intermediates in the production of cellular materials and especially for use in the production of rigid polyurethane foams which are used for both sound and thermal insulation and also in curtain wall construction, which has recently been used in the building industry.

The intermediates prepared in accordance with this invention are advantageous in that they have an extremely low vapor pressure and are practically odorless and nontoxic. Also by comparison with unmodified 4,4'-diisocyanato-diphenyl methane, they show an improved storage capacity and have substantially no tendency toward crystallization.

The invention is further illustrated by the following examples in which the parts are by weight unless otherwise specified.

*Example 1*

From an amine mixture consisting of about 2 parts of 2,4'-diaminodiphenyl methane, about 85 parts of 4,4'-diaminodiphenyl methane, about 12 parts of 2,4-bis-(4-aminobenzyl)-aniline and about 3 parts of trifunctional diphenyl methane bases, a mixture of polyisocyanates is obtained by reaction with phosgene in chlorobenzene solution, up to 95.8% of the total nitrogen content of the mixture, after evaporating the solvent, being contained in the isocyanate groups.

The crude isocyanate is heated to 189° C. while stirring. After 4½ hours, still 89.8% of the total nitrogen are to be found in isocyanate groups. The mixture is cooled to 20° C. After a final reaction for 10 hours, only 86.2% of the total nitrogen still remain in free —NCO groups.

The product remains liquid at room temperature.

*Example 2*

An amine mixture of about 1 part of 2,4'-diaminodiphenyl methane, about 76 parts of 4,4'-diaminodiphenyl methane, about 15 parts of 2,4-bis-(4-aminobenzyl)-aniline and about 8 parts of tetra-, penta- and hexafunctional diphenyl methane bases can be reacted with a yield of 96.5%, based on amino groups introduced, to the corresponding isocyanate mixture. The concentrate free from the solvent is heated for about 3 hours at about 200° C. at a vacuum of about 50 mm. Hg., the isocyanate nitrogen falling to 91.0% of the total nitrogen. About 15 hours later, an isocyanate nitrogen of 89.5% is found in the sample kept at room temperature. The product no longer crystallizes.

*Example 3*

Pure, distilled 4,4'-diisocyanato-diphenyl methane is heated for about 11 hours at about 220° C., the isocyanate content expressed in parts of the equivalent weight 42, falling from about 33.5% to about 25.8%. After standing for about 24 hours at room temperature, the final product solidified in crystalline form still contains about 22.8% of free isocyanate groups.

Although the invention has been described in considerable detail for the purpose of illustration, it is to be understood that variations may be made therein by those skilled in the art without departing from the spirit of the invention and the scope of the claims.

What is claimed is:

1. A carbodiimide-isocyanate adduct of diphenylmethane diisocyanate which absorbs light in the infra-red range of from 5.76 to 5.78 microns and from 7.24 to 7.22 microns.

2. A process for the production of a carbodiimide-polyisocyanate adduct containing free isocyanate groups, which comprises heating to a temperature of from about 150° C. to about 300° C. polyisocyanates of the diphenyl methane series until a maximum of 33% of the existing isocyanate groups have reacted to form the carbodiimide containing at least two —NCO groups and cooling said reaction mass.

3. A process for the production of a carbodiimide-polyisocyanate adduct containing free isocyanate groups which comprises heating to a temperature of from about 180° C. to about 220° C. polyisocyanates of the diphenyl methane series until a maximum of 33% of the existing isocyanate groups have reacted to form the carbodiimide containing at least two —NCO groups and cooling said reaction mass.

4. A process for the production of a carbodiimide-polyisocyanate adduct containing free isocyanate groups which comprises heating the polyisocyanates formed by the phosgenation of the reaction product of aniline and formaldehyde to a temperature of from about 150° C. to about 300° C. until a maximum of 33% of the existing isocyanate groups have reacted to form the carbodiimide containing at least two —NCO groups and cooling said reaction mass.

5. A process for the production of a carbodiimide-polyisocyanate adduct containing free isocyanate groups, which comprises heating to a temperature of from about 150° C. to about 300° C. a mixture of 2,4'-diisocyanato-diphenyl methane, 4,4'-diisocyanatodiphenyl methane, 2,4 - bis-(4-isocyanatobenzyl) - phenylisocyanate, tetra-, penta- and hexafunctional diphenyl methane bases until a maximum of 33% of the existing isocyanate groups have reacted to form the carbodiimide containing at least two —NCO groups and cooling said reaction mass.

6. A process for the production of a carbodiimide-polyisocyanate adduct containing free isocyanate groups, which comprises heating to a temperature of from about 150° C. to about 300° C. 4,4'-diphenyl methane diisocyanate until a maximum of 33% of the existing isocyanate groups have reacted to form the carbodiimide containing at least two —NCO groups and cooling said reaction mass.

7. A process for the production of carbodiimide-polyisocyanate adducts having free isocyanate groups which comprises heating to a temperature of from about 150° C. to about 300° C. a diphenylmethane diisocyanate until a maximum of 33% of the existing isocyanate groups have reacted as indicated by the amount of carbon dioxide liberated, to form the carbodiimide containing at least two —NCO groups and cooling the reaction mass.

References Cited in the file of this patent

UNITED STATES PATENTS

| | | |
|---|---|---|
| 2,840,589 | Smeltz | June 24, 1958 |
| 2,941,966 | Campbell | June 21, 1960 |
| 2,950,263 | Abbotson et al. | Aug. 24, 1960 |

FOREIGN PATENTS

| | | |
|---|---|---|
| 1,012,601 | Germany | July 25, 1957 |